June 14, 1927.

W. E. SCHNITGER

TRACTOR HITCH

Filed Sept. 1, 1926

W. E. Schnitger
INVENTOR

BY Victor J. Evans
ATTORNEY

June 14, 1927.
W. E. SCHNITGER
TRACTOR HITCH
Filed Sept. 1, 1926
1,632,509
2 Sheets-Sheet 2
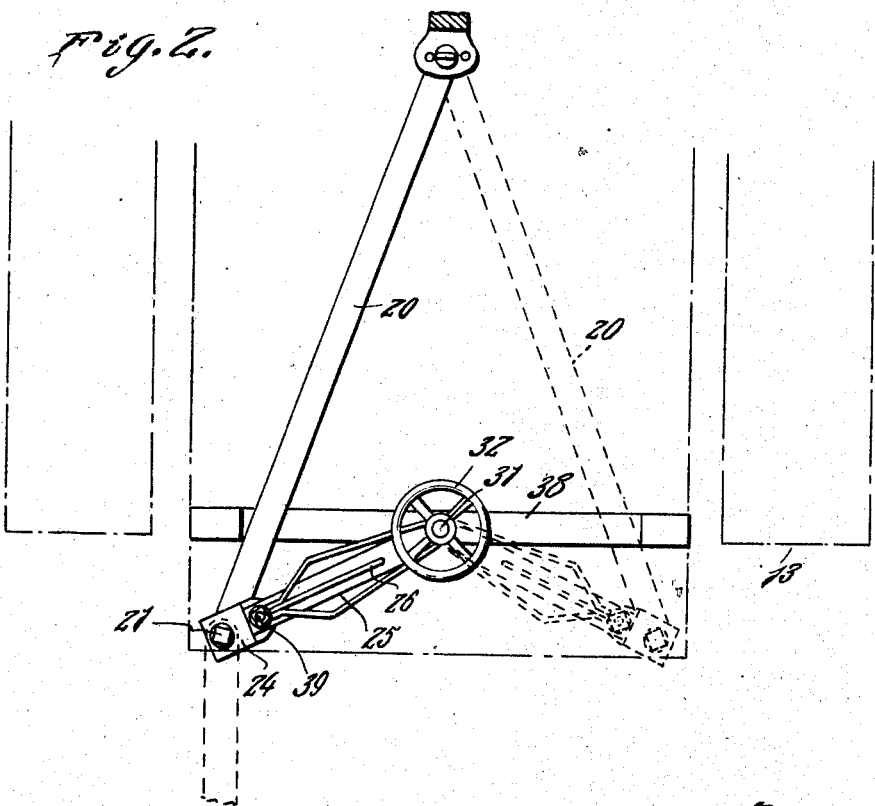
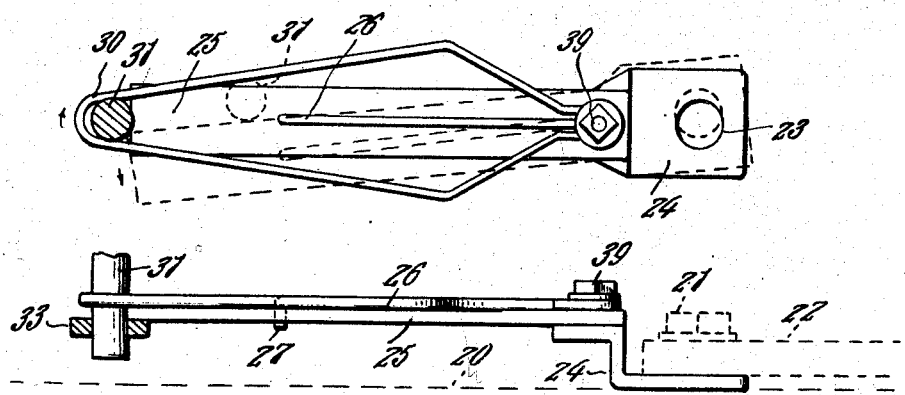
W. E. Schnitger INVENTOR
BY Victor J. Evans ATTORNEY Patented June 14, 1927.

UNITED STATES PATENT OFFICE.

WILLIAM E. SCHNITGER, OF GARDEN GROVE, CALIFORNIA.

TRACTOR HITCH.

Application filed September 1, 1926. Serial No. 133,052.

The object of this invention is to provide a tractor hitch by means of which the draw bar, when released manually from a locking position, will be shifted automatically to the other side of the machine when making a turn at the end of a row.

A further object is to provide a device of this type which shall include an arm adapted for pivotal connection with the outer end of the draw bar, said arm mounting a frame of loop form, extending lengthwise of the arm, and having a narrow end thru which a retaining and releasing pin projects, when in the locking position, the pin being movable alongside of the arm, permitting shifting of the draw bar when the releasing pin is operated to produce the disengaging movement.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 2 is a plan view, showing a portion of a tractor, or the rear wheels thereof, in dotted lines, and showing in full lines a draw bar controlled by the attachment herein described, and movable automatically, when the locking means are released, to the dotted line position.

Figure 3 is a plan view of the attachment per se.

Figure 4 is a view in edge elevation, of the structure of Figure 3, the position of the draw bar of Figure 2 being illustrated, and of the device for effecting direct connection with the machine to be drawn.

Figure 1:
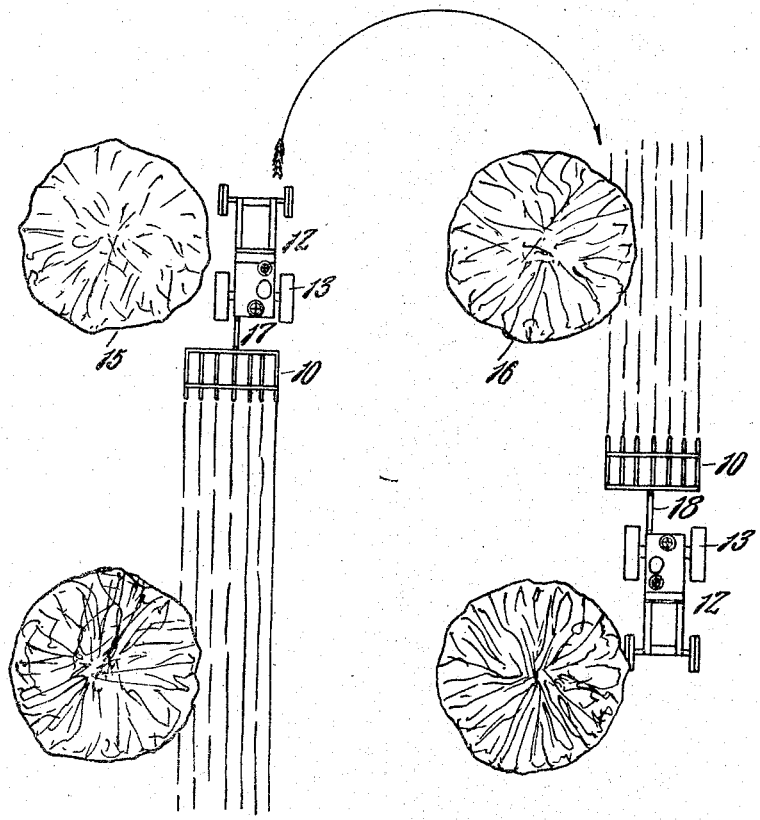
Figure 1 shows diagrammatically the change of position of the tractor hitch when the tractor makes a turn at the end of a row of trees in an orchard, or under any similar conditions.
Figure 5:
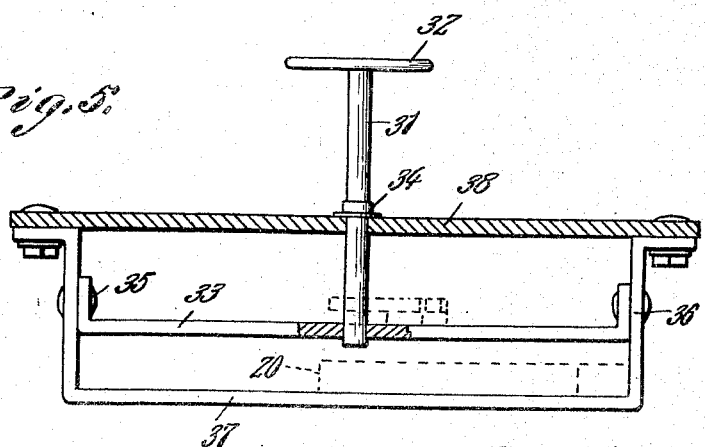
Figure 5 is a view in vertical section and elevation, showing the mounting of the vertical rotatable releasing pin or stem, which appears in horizontal section at the left of Figure 3.

In Figure 1 the machine to be drawn is shown conventionally and is designated 10, a tractor is designated 12, the rear wheels being illustrated at 13, and the latter also being shown in dotted lines in Figure 2.

Assuming that the tractor is making a turn between the rows, or at the end of the row in an orchard, the trees at the ends of two adjacent rows being illustrated at 15 and 16, then the tractor moves from the position at the left of Figure 1 to the position at the right thereof, and in so doing the hitch shifts automatically from the position shown at 17 to the position shown at 18. This operation takes place when the locking device is released manually, in the manner indicated below.

The draw bar 20 has connection by means of a pin or bolt 21 with the draft bar 22 adapted for direct connection with the machine to be drawn. Bolt 21 also passes thru an aperture 23 in offset bracket 24, and the latter carries a bar or arm 25, of such length that the vertical shaft, stem or locking pin is at the end of bar 25 when the draw bar 20 is at the extreme left or extreme right in Figure 2, these being the locking positions.

Arm 25 is movable angularly about the pivot or bolt 21, and a spring 26 has an offset end 27 projecting into or thru bar 25, the opposite end of the spring being fixed, and said element 26 constituting a centering spring.

A frame or loop member 30 has a narrow end portion, projecting beyond the end of arm 25, so that stem 31 may pass thru the space within the end portion of the loop, at the end of arm 25. Stem 31 carries a wheel 32, and its lower end is rotatably mounted in a transverse element 33, the stem also having a bearing at 34. Transverse member 33 is connected at 35 and 36 with opposite portions of a U-frame 37, the latter being suspended from transverse member 38. Moderate changes in the manner of mounting these parts may be made, within the scope of the claim, in order to meet the conditions existing in connection with tractors of different makes.

The rotation of wheel 32 and stem 31, the latter being in contact with the end of arm 25, tends to produce the movement to the dotted line position of Figure 3, so that the frame 30, mounted at one end by means of pin or bolt 39, provides a space on one side or the other of arm 25, and the attachment then has sufficient play with reference to stem 31, to permit of the necessary reduction in distance between the pivoted end portions of the attachment to permit the draw bar 20 to shift from the full line position of Figure 2 to the dotted line position in that view.

This movement of the draw bar from one side of the machine to the other, as indicated in Figure 2, takes place automatically when the tractor makes the turn at the end of the row, provided that the elements are moved, by turning wheel 32 and stem 31 so that locking engagement, illustrated in full lines in Figure 3, may terminate, and the parts caused to assume the release position.

Having described the invention what is claimed is:—

In a device of the class described, a draw bar, a spring held arm pivoted at one end to the draw bar and connected therewith, the arm being movable in a horizontal plane, a stem circular in cross section and rotatable about an axis perpendicular to the arm and engaging the end of the latter, and a retaining and guiding device having one end partly surrounding the stem, and having its other end secured, said guiding device normally holding the end of the arm in locking engagement with the stem, and the arm being movable by the stem and along side of the latter to release position.

In testimony whereof I affix my signature.

WILLIAM E. SCHNITGER.